Dec. 24, 1929.  R. E. ASHTON  1,740,916
GEAR SHIFT LEVER GUIDE
Filed May 29, 1928
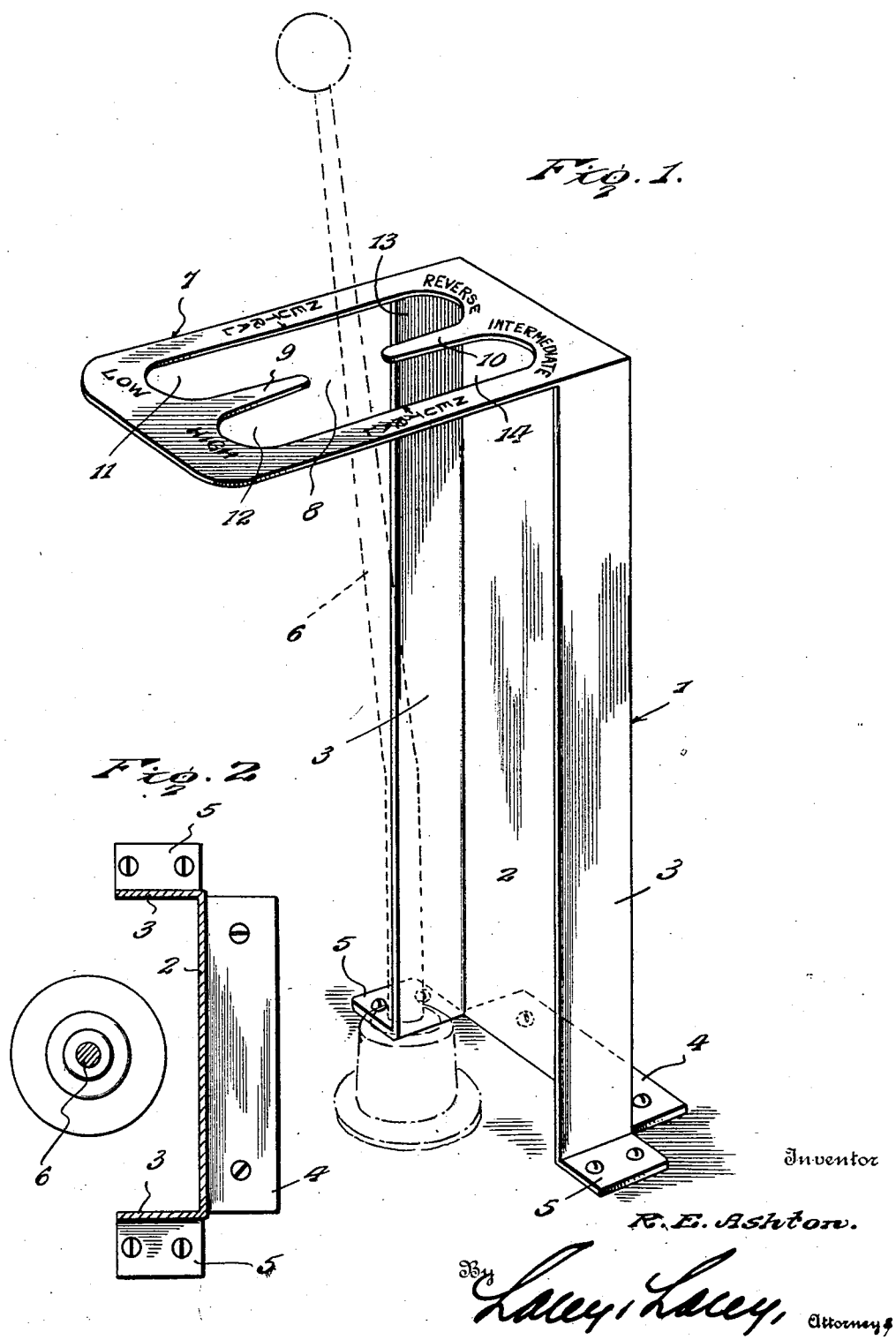

Patented Dec. 24, 1929

1,740,916

UNITED STATES PATENT OFFICE

RALPH E. ASHTON, OF ARVADA, COLORADO

GEAR-SHIFT-LEVER GUIDE

Application filed May 29, 1928. Serial No. 281,551.

The present invention is directed to improvements in gear shift lever guides.

The primary object of the invention is to provide a device of this character adapted to be attached to an automobile for cooperation with the gear shift lever thereof in order that a person not familiar with the operation of the gear shift lever can readily note the proper position of the lever when learning to drive a car equipped with such lever.

Another object of the invention is to provide a device of this kind which can be conveniently attached to the floor board of an automobile in order that the guiding designations will be in plain sight of the driver.

With these and other objects in view, this invention resides in the novel features of construction, formation, combination and arrangement of parts to be hereinafter more fully described, claimed and illustrated in the accompanying drawing, in which:—

Figure 1 is a perspective view of the device.

Figure 2 is a transverse sectional view therethrough.

Referring to the drawing 1 designates a sheet metal standard which includes a front wall 2 and angularly disposed side walls 3, said walls being provided, respectively with horizontal flanges 4 and 5 which are adapted to be secured to the floor board of an automobile adjacent the conventional shift lever 6 indicated by dotted lines Figure 1.

Formed integral with the upper end of the standard 1 is a horizontal plate 7, said plate being cut to provide an opening 8, said opening having extending thereinto oppositely disposed fingers 9 and 10, the opposed ends of which being spaced a sufficient distance apart to permit free passage of the shift lever. By providing the finger 9 slots 11 and 12 are provided upon the opposite sides thereof, the slot 11 having direct communication with the slot 13 formed upon one side of the finger 10, while the slot 12 is in direct communication with the slot 14 formed from the reverse side of said finger. The slot 11 has the word "Low" associated therewith, such word being stamped or otherwise suitably applied to the plate, while the slot 13 has the word "Reverse" associated therewith. The slots 12 and 14 are designated by the words "High" and "Intermediate," respectively, while the words "Neutral" are marked upon the plate in transverse alignment.

It will be of course obvious that when the lever is in the position as shown in Figure 1 that the gear is in Neutral and when it is desired to start the automobile it is only necessary to shift the lever into the slot bearing the word Low, after which it is moved therefrom through Neutral and into the slot 14 for Intermediate gear, and as usual is then shifted into the slot 12 for propelling the automobile in High gear.

The device is particularly designed for use by persons who have been accustomed to driving a planetary gear shift car and when in place will obviously help the person to readily ascertain at a glance the necessary position of the shift lever when starting and driving a car equipped with a gear shift lever.

From the foregoing, it is thought that the construction, operation and many advantages of the herein described invention will be apparent to those skilled in the art, without further description, and it will be understood that various changes in the size, shape, and proportion and minor details of construction, may be resorted to without departing from the spirit or sacrificing any of the advantages of the invention.

What is claimed is:—

A device of the character described comprising a standard including a front wall and side walls, means carried by the lower ends of the respective walls for attachment to an automobile, the upper end of the standard having formed integral therewith a horizontally disposed plate, said plate having an opening therein, fingers carried by the plate and extending into the opening and having their opposite ends spaced, said fingers dividing the plate into communicating slots for selective engagement with the shift lever of an automobile.

In testimony whereof I affix my signature.

RALPH E. ASHTON. [L. S.]